United States Patent [19]

Takahashi

[11] Patent Number: 5,099,428
[45] Date of Patent: Mar. 24, 1992

[54] SHIFTING CONTROL SYSTEM FOR AUTOMOTIVE AUTOMATIC POWER TRANSMISSION WITH NEURON COMPUTER WITH REFINED DATA SAMPLING AND SHIFTING PATTERN RECOLLECTION CHARACTERISTICS

[75] Inventor: Hiroshi Takahashi, Kanagawa, Japan

[73] Assignee: Nissan Motor Company, Limited, Yokohama, Japan

[21] Appl. No.: 462,413

[22] Filed: Jan. 9, 1990

[30] Foreign Application Priority Data

Jan. 9, 1989 [JP] Japan .................................. 1-3284

[51] Int. Cl.⁵ ........................................... B60K 41/06
[52] U.S. Cl. ................................. 364/424.1; 74/866
[58] Field of Search .............. 364/424.01, 424.1, 148; 74/866

[56] References Cited

U.S. PATENT DOCUMENTS

| | | | |
|---|---|---|---|
| 4,584,906 | 4/1986 | Nagaoka et al. | 74/866 |
| 4,774,677 | 9/1988 | Buckley | 364/148 X |
| 4,777,585 | 10/1988 | Kokawa et al. | 364/164 |
| 4,809,175 | 2/1989 | Hosaka et al. | 364/424.1 |
| 4,841,815 | 6/1989 | Takahashi | 74/866 |
| 4,930,079 | 5/1990 | Kondo | 364/424.1 |
| 4,930,084 | 5/1990 | Hosaka et al. | 364/424.01 |

OTHER PUBLICATIONS

King et al.: The Application of Fuzzy Control Systems to Industrial Processes, Automation vol. 13, pp. 235-242 Pergamon Press 1977.
Kaoru Nakano, "Associatron—A Model of Associative Memory", IEEE Transactions on Systems, Man, and Cybernetics, vol. SMC-2, No. 3, Jul. 1972, pp. 380-389.

*Primary Examiner*—Salvatore Cangialosi
*Attorney, Agent, or Firm*—Foley & Lardner

[57] ABSTRACT

A shift control system for an automatic power transmission incorporates a storage means, responsive to an entered shifting demand, for temporarily storing instantaneous preselected shift control parameter data relative to the entered shifting demand. The control system also includes means for detecting the vehicular driving condition where no shifting demand may occur, for updating driving pattern data which is used for recollection of a driving pattern corresponding to or approximately corresponding to one of a shifting pattern or a schedule so that updating of the driving pattern data may not interfere with recollection of the driving pattern to enable appropriate selection of the transmission speed ratio at any vehicle driving condition.

3 Claims, 8 Drawing Sheets

FIG. 10

$\overbrace{\phantom{XXXXXXXXXXXX}}^{5}$ $5\Big\{$
| $X_1$ | $X_2$ | $X_3$ | $X_4$ | $X_5$ |
|---|---|---|---|---|
| ○ | ○ | ○ | ○ | ○ |
| $X_6$ | $X_7$ | $X_8$ | $X_9$ | $X_{10}$ |
| ○ | ○ | ○ | ○ | ○ |
| $X_{11}$ | $X_{12}$ | $X_{13}$ | $X_{14}$ | $X_{15}$ |
| ○ | ○ | ○ | ○ | ○ |
| $X_{16}$ | $X_{17}$ | $X_{18}$ | $X_{19}$ | $X_{20}$ |
| ○ | ○ | ○ | ○ | ○ |
| $X_{21}$ | $X_{22}$ | $X_{23}$ | $X_{24}$ | $X_{25}$ |
| ○ | ○ | ○ | ○ | ○ |

FIG. 12

| $X_1$ | $X_2$ | $X_3$ | $X_4$ | $X_5$ |
|---|---|---|---|---|
| ○ | ○ | ○ | ● | ○ |
| $X_6$ | $X_7$ | $X_8$ | $X_9$ | $X_{10}$ |
| ○ | ○ | ● | ● | ○ |
| $X_{11}$ | $X_{12}$ | $X_{13}$ | $X_{14}$ | $X_{15}$ |
| ○ | ○ | ○ | ● | ○ |
| $X_{16}$ | $X_{17}$ | $X_{18}$ | $X_{19}$ | $X_{20}$ |
| ● | ● | ○ | ● | ○ |
| $X_{21}$ | $X_{22}$ | $X_{23}$ | $X_{24}$ | $X_{25}$ |
| ○ | ○ | ○ | ○ | ○ |

SHIFTING CONTROL SYSTEM FOR AUTOMOTIVE AUTOMATIC POWER TRANSMISSION WITH NEURON COMPUTER WITH REFINED DATA SAMPLING AND SHIFTING PATTERN RECOLLECTION CHARACTERISTICS

BACKGROUND OF THE INVENTION

1. Field of the Invention

The present invention relates generally to a control system for an automotive automatic power transmission which can adapt shifting timing of the transmission to a driver's feeling utilizing fuzzy logic. More specifically, the invention relates to an intelligent control system for an automatic power transmission adapting an automated transmission shifting pattern to a vehicle driving pattern of a specific driver. Further particularly, the invention relates to a transmission shifting control system with refined learning and recollection characteristics for updating parameter data and selecting a shifting pattern based on input parameter data.

2. Description of the Background Art

In the modern automatic power transmission control systems, electronic control units have been employed for precisely and optimally controlling shifting of the automatic power transmissions. Some modernized transmission control systems employ variable shift pattern strategy for adapting transmission shift patterns to vehicle driving patterns which are determined generally based on vehicle speed and throttle valve angular positions. For example, Japanese Patent First (unexamined) Publications (Tokkai) Shows 59-200845 and Showa 59-200848 disclose transmission control systems which employ shifting tables containing a plurality of transmission speed ratio shifting patterns.

Tokkai Showa 59-200845 discloses a transmission control system which has two transmission gear shifting pattern maps. One map is directed to a general shift pattern to be used in usual traffic. The other map is directed to a special shift pattern for extraordinarily heavy traffic. The proposed system utilizes a throttle pedal depression pattern as a parameter for selecting one of two transmission shifting pattern maps. On the other hand, Tokkai Showa 59-200848 discloses a similar transmission control system for selectively using transmission shifting pattern maps. In the proposed system, longitudinal acceleration is used as a parameter for selecting one of the maps.

In either case, the prior proposed transmission control systems employ a singular parameter for selecting shifting pattern maps. In such a type of transmission control, the selected parameter is compared with a predetermined criterion for selecting one of the preset transmission shift patterns. This encounters drawbacks because the singular parameter does not always represent an actual driving condition. That is, in practical control, failure of detection of the driving condition may cause erroneous selection of the inappropriate shifting pattern and degrading drivability of the vehicle.

On the other hand, some of the prior proposed automatic power transmission shifting control systems employ microprocessor or microcomputer based control modules. The control module stores data in a form of maps relative to various kinds of shift patterns including a power pattern where an acceleration performance is emphasized and an economy pattern where fuel economy is emphasized. Sensor output signals from a throttle sensor and a vehicle speed sensor are supplied to the control module. Based on the sensor signals, the control module performs a selected operation among the above-mentioned maps and then a look-up operation for the map is selected to retrieve transmission ratio data arranged in the map versus throttle open angle and a vehicle speed indicated by the sensor signals. The control module generates a shift signal indicative of the transmission ratio obtained. In this manner, a fine selection among transmission ratios is made to determine a transmission ratio most suitable for a driving condition of the vehicle.

With such a known control system, the plurality of maps are provided and selected in accordance with various vehicular driving conditions. There occur events where a shift between transmission ratios is made in accordance with an inappropriate shift schedule which is not adapted to the vehicular driving condition. This is where an improvement needs to be made. If all shift points fit for all available driving conditions of the vehicle were to be set, the number of maps would be considerably increased. Therefore, it is common practice to limit the number of shift patterns, each being fit to one of the representative driving conditions.

In order to solve the problem set forth above, the co-pending U.S. patent application Ser. No. 07/175,350, filed on Mar. 30, 1988, and assigned to the common assignee to the present invention, proposes an automatic power transmission control system employing fuzzy-logic. According to this prior proposal, fuzzy-logic is employed in order to determine a transmission ratio suitable for vehicle driving conditions. In the fuzzy-logic control module, a series of membership functions are referred to based on a series of signals representative of the vehicle driving conditions. The membership functions are fixed once they are set, so that it is impossible to provide shift characteristics with sufficient flexibility to cope with different drivers' driving behavior and different environments in which the automotive vehicle may be involved.

Further prior proposals have also been made in U. S. Pat. No. 4,777,585, issued on Oct. 11, 1988 to Kokawa et al, for the invention relating to "Anological Inference Method and Apparatus for a Control System"; and U.S. Pat. No. 4,809,175, issued on Feb. 28, 1989, to Hosaka et al. for the invention relating to "Vehicle Control System and Method Therefor".

These prior proposals also employ fuzzy logic for adapting a transmission speed ratio selecting schedule or pattern to the drivers' feeling or vehicular driving pattern. In addition, the co-pending U.S. patent application Ser. No. 7/309,442, filed on Feb. 13, 1989 now U.S. Pat. No. 5,019,979, which has been commonly assigned to the assignee of the present invention, discloses "Control for Automatic Transmission", in which there is disclosed a fuzzy logic controlled automatic transmission of an automotive vehicle comprising a series of detectors for detecting parameters indicative of the vehicle driving conditions and generating a series of detector signals indicative of the parameters detected. A fuzzy logic control module contains a series of rules of thumb, each being expressed by a series of membership functions of the detector signals and recommending a position which the automatic transmission should take. In the fuzzy logic control module, the series of rules of thumb signals to determine the degrees to which the series of rules of thumb are satisfied, and a position which the automatic transmission should take is determined. An output signal is generated by the fuzzy logic control module which is indicative of the position determined. A modifier is provided which changes or modifies at least one of the series of membership functions of at least one of the series of rules of thumb when the history of at least one of the series of detector signals shows a predetermined state. Another proposal has also been made by the common assingee to the present invention in the co-pending U.S. patent application Ser. No. 7/375,970, filed on July 6, 1989, which relates to an invention "Shifting Control for Automatic Power Transmission with Learning Shifting Pattern Model and Selecting Shifting Pattern Model from Closest Vehicular Driving Pattern", in which it is disclosed that a transmission gear shifting control system is selective of speed ratio of an automotive automatic power transmission. The control system employs a strategy of learning of driving conditions in order to select one of a plurality of vehicle driving patterns so as to adapt to the vehicular driving condition and the driver's desire, by means of a neuron computer. The system monitors a plurality of vehicle driving parameters and stores driving pattern data in an associative storage for forming stored driving patterns. The driving pattern data is stored in terms of relevant one of a transmission gear shifting patterns so that the transmission gear shifting pattern can be selected in response to entry of the stored relevant driving pattern. The control system is further operable for associatively recollecting one of the driving patters on the basis of the monitored driving parameters and stored driving patterns.

The last mentioned prior proposal made by the common assignee to the present invention incorporates a neuron computer system known as an "ASSOCIATRON". In bries, concerning this ASSOCIATRON, the logic of the "ASSOCIATRON" has been proposed by Doctor Nakano of Tokyo University and discussed in "Information System in Brain formed by Basic", published by Keigaku Shuppan K.K. on Mar. 30, 1988, pp17-29. Discussion concerning the "ASSOCIATRON" will be herein incorporated by reference thereto for the sake of disclosure.

The logic of the "ASSOCIATRON" generally includes patterning of received information, writing of patterned information in an associative storage and recollecting information from the associative storage. The "ASSOCIATRON" utilizes associative storage model as shown in FIGS. 8 and 9. The associative storage model contains a plurality of storage elements $X_i$ (i = 1, 2, 3 . . . ) arranged in a form of a storage array and associated with adjacent storage elements via information transfer elements $M_i$. In the logic of the "ASSOCIATRON", each of the storage elements $X_i$ is referred to as a "neuron". Therefore, in the following disclosure, the word "neuron" is used for representing a storage element in an associative storage model in the "ASSOCIATRON". Also, the information transfer elements $M_i$ (i = 1, 2, 3 . . . ) connecting the neurons $X_i$ are each referred to as a "synapse" in the "ASSOCIATRON". Therefore, in the following discussion, the word "synapse $M_i$" will be used for representing the information transfer elements. Each neuron $X_i$ is variable in state amount 1, be appreciated herefrom, according to the recollection input pattern of FIG. 12, the excitation pattern of FIG. 11(b) is the closest. As can be seen from FIG. 11(b), the stored pattern contains excited neurons $X_4$, $X_8$, $X_9$, $X_{12}$, $X_{14}$, $X_{16}$, $X_{17}$, $X_{18}$, $X_{19}$, $X_{20}$, $X_{24}$. Therefore, in the associative recollection according to the "ASSOCIATRON", the neurons $X_{12}$, $X_{18}$, $X_{20}$ and $X_{24}$ are assumed as excited and thus a figure pattern of four (4) is recollected in response to input of the recollection input pattern of FIG. 12.

By utilizing the strategy in the "ASSOCIATRON" as set forth above, patterning of the vehicular driving patterns and recollection utilizing stored patterns in the associative storage and "ASSOCIATRON" logic for associative recollection, the automatic power transmission gear shifting pattern adapted to the vehicular driving pattern is selected.

The prior proposed system set forth above is capable of adpating the transmission shifting pattern to the driver's feeing by learning a shifting pattern and associated vehicular driving condition utilizing the logic of an ASSOCIATRON. On the other hand, in such a system, updating of map data takes place whenever transmission gear shifting is commanded. This prevents associative recollection. In general, demand for recollection arises when variation of the transmission speed ratio is required due to a change of the vehicular driving condition. In such an occasion high response to the speed ratio variation demand is desired so as to prevent the engine performance from being degraded due to low response characteristics.

SUMMARY OF THE INVENTION

Therefore, it is an object of the present invention to provide fuzzy-logic control for an automotive automatic power transmission with data sampling and shifting schedule recollection timing solving the aforementioned problems.

In order to accomplish the aforementioned and other objects, a shift control system for an automatic power transmission, according to the present invention, incorporates a storage means, responsive to an entered shifting demand, for temporarilly storing instantaneous preselected shift control parameter data relative to the entered shifting demand. The control system also includes means for detecting the vehicular driving condition where no shifting demand may occur, for updating driving pattern data which is used for recollection of a driving pattern corresponding to or approximately corresponding to one of a shifting pattern or schedule so that updating of the driving pattern data may not interfere with recollection of the driving pattern and enables appropriate selection of the transmission speed ratio at any vehicle driving condition.

According to one aspect of the invention, a control system for controlling transmission gear shifting for an automative power transmission of an automotive vehicle comprises:

first means, associated with the automatic transmission for causing variation of the transmission speed ratio at a desired speed ratio;

second means for manually commanding by entering a mode selector command for selecting one of a plurality of transmission gear shifting patterns;

third means for monitoring a plurality of vehicle driving parameters for producing parameter data representative of a respective monitored parameter;

fourth means for receiving the parameter data and forming driving pattern data representative of a current vehicle driving condition, the driving pattern data containing individual parameter indicative data components corresponding to a respective transmission gear shifting control parameter, and coupling data components respectively representative of the relationship between individual parameter indicative data components;

fifth means, responsive to the mode selector command, for temporarily storing the driving pattern data;

sixth means for storing the driving pattern with respect to various vehicle driving conditions and with respect to various transmission gear shifting patterns and, responsive to a vehicle driving condition satisfying a predetermined updating condition, for updating the driving pattern corresponding to a selected one of the transmission gear shifting patterns with the driving pattern data stored in the fifth means;

seventh means for receiving the parameter data and associatively recollecting one of the stored driving pattern data so as to select one of the transmission gear shifting patterns corresponding to the recollected driving pattern; and eighth means for selecting a transmission speed ratio on the basis of the parameter data from the second means and according to a selected one of the transmission gear shifting patterns, so to as operate the first means for setting the transmission at the derived speed ratio.

In the preferred embodiment, the sixth means detects a vehicle driving condition in which a demand for variation of the transmission speed ratio cannot occur as the predetermined updating condition. Further preferably, the sixth means detects a state where the vehicle stops as the predetermined updating condition. The sixth means may include a matrix of memory cells for storing the individual parameter indicative data components and variable of stored data between mutually distinct first and second values, the matrix containing a plurality of first matrix lines respectively provided for respective ones of the individual parameter indicative data components and a plurality of second matrix lines respectively provided for representing a range of values of respective individual parameter indicative data components. In addition, the sixth means further includes a storage unit for storing the coupling data components which is variable in values depending upon the relationship between respective relevant pairs of individual parameter indicative data components.

According to another aspect of the invention, a neuron computer based control system for controlling transmission gear shifting for an automative power transmission of an automotive vehicle comprises:

first means, associated with the automatic transmission for causing variation of a transmission speed ratio at a desired speed ratio;

second means for manually commanding by entering a mode selector command for selecting one of a plurality of transmission gear shifting patterns;

third means for monitoring a plurality of vehicle driving parameters for producing parameter data representative of respective ones of monitored parameters;

fourth means for temporarily storing the parameter data in response to the mode selector command;

fifth means, having neuron elements forming a storage matrix and synapse elements for intercoupling pairs of neuron elements, for receiving the parameter data and forming driving pattern data representative of a current vehicle driving condition, the driving pattern data containing individual parameter indicative data components corresponding to respective transmission gear shifting control parameter, which individual parameters indicative data components are stored in the neuron elements, and coupling data components representative of the strength of the synapse elements intercoupling pairs of neuron elements;

sixth means for normally disabling the fifth means for updating the content of respective neurons and synapses and responsive to a vehicle driving condition satisfying a predetermined updating condition for enabling the fifth means for updating;

seventh means for receiving the parameter data and associatively recollecting one of the stored driving pattern data so as to select one of the transmission gear shifting patterns corresponding to the recollected driving pattern; and eighth means for selecting a transmission speed ratio on the basis of the parameter data from the second means and according to a selected one of the transmission gear shifting patterns, so to as operate the first means for setting the transmission at the derived speed ratio.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings:

FIGS. 8 through 12 are explanatory illustrations provided for discussing the logic of the "ASSOCIATRON" which is employed for associatively selecting one of the stored models of transmission speed ratio shifting patterns in which FIG. 8 shows a diagrammatical illustration of the basic structure of the "ASSOCIATRON";

FIG. 9 shows an equivalent circuit of the basic structure of the "ASSOCIATRON" of FIG. 8;

FIG. 10 shows a matrix of "neurons" in an associative storage unit, employed in the "ASSOCIATRON";

FIG. 12 shows the matrix of "neurons" for which inputs are provided, which are used as parameter for recollection of data stored in the associative memory utilizing the logic of the "ASSOCIATRON".

PREFERRED EMBODIMENT OF THE INVENTION

Figure 1:
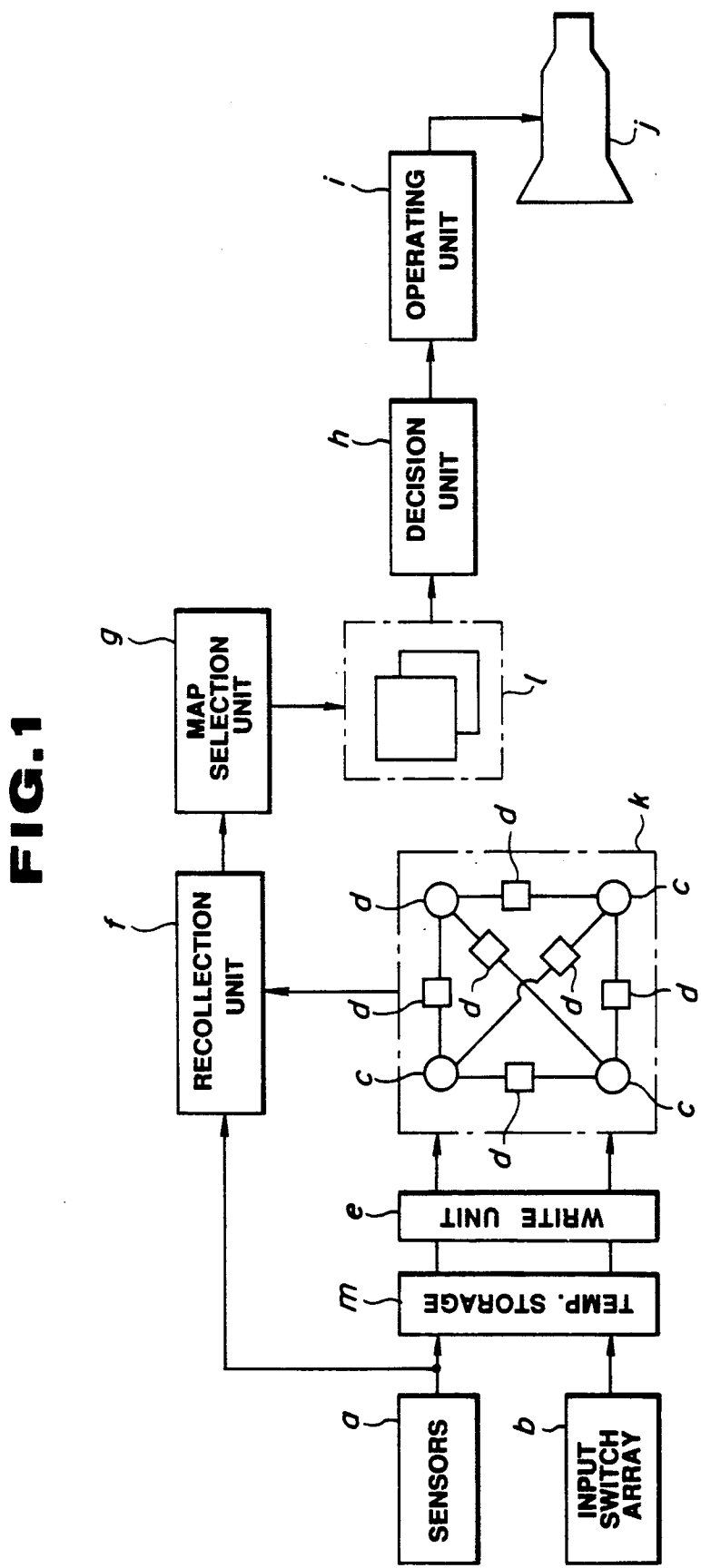
FIG. 1 is a schematic illustration showing the general idea of an automatic power transmission gear shifting control system according to the present invention.
Figure 2:
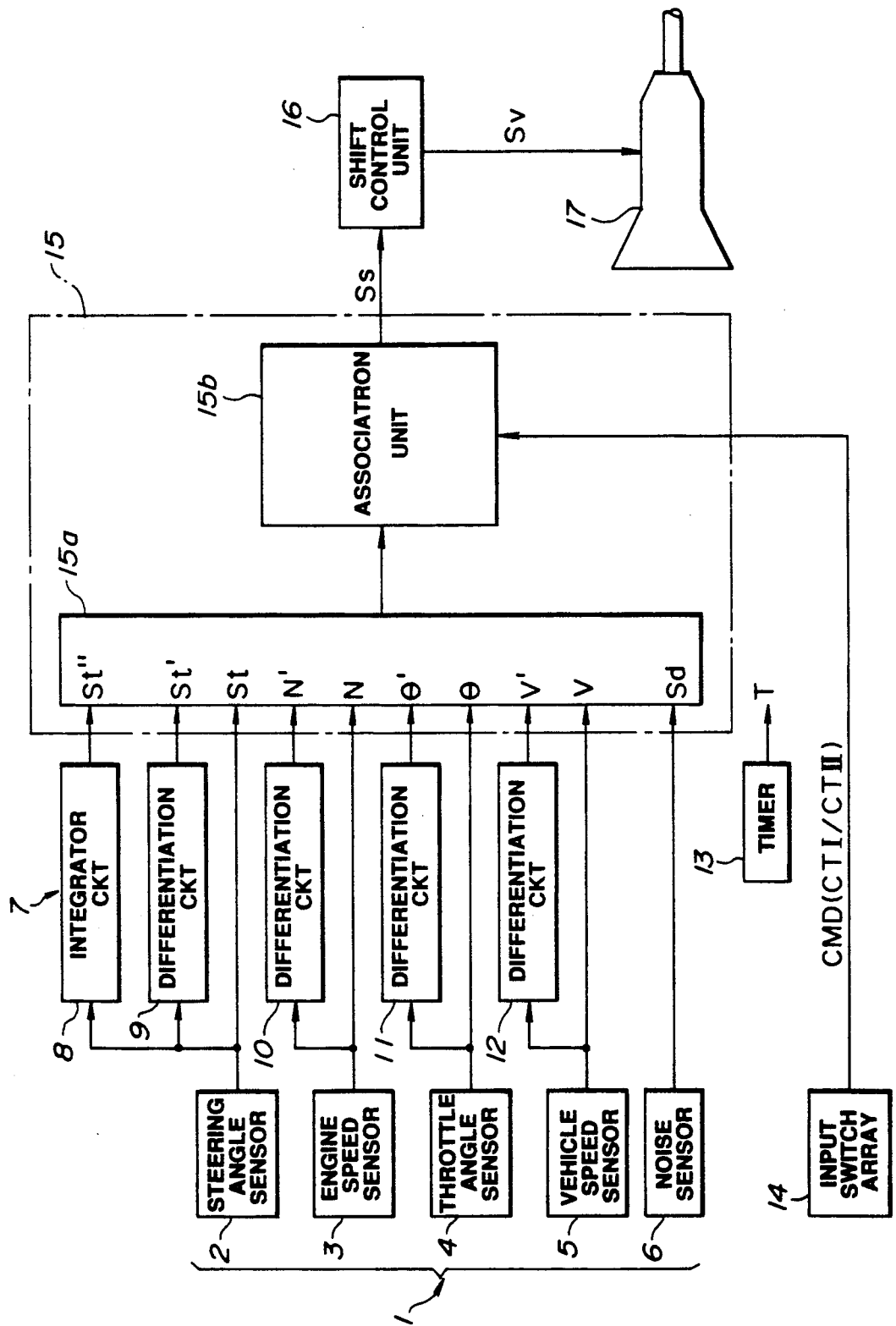
FIG. 2 is a block diagram of the preferred embodiment of the automatic power transmission gear shifting control system according to the present invention.

Referring to FIGS. 1 and 2, the automatic power transmission gear shifting control system according to the present invention has a plurality of sensors or detectors a which monitor various preselected vehicle driving parameters for providing vehicle driving condition indicative gear shifting control parameter data. The control system also has a manually operable input switch array b which is operable for manually inputting a command for transmission gear shifting operation by a driver. These sensors a and the input array b are connected to a temporary storage means m which is responsive to the command for transmission gear shifting for storing driving parameter data provided by the sensors or detectors a. The temporary storage means m is connected to a write unit e. The write unit e is associated with an "ASSOCIATRON" unit k. The write unit e forms a write pattern representative of the vehicle driving pattern on the basis of the information containing the transmission gear shifting control parameter data from the sensors or detectors a and the driver's input command data b. The write pattern formed by the write unit e is transferred to the "ASSOCIATRON" unit k containing a plurality of neurons c and a plurality of synapses d which transfer information between the neurons. According to the write pattern, the relevant neurons c are excited to form an associative storage pattern representative of the vehicular driving pattern. The formed associative storage pattern is then stored in an associative storage in the "ASSOCIATRON" unit k.

On the other hand, the transmission gear shifting control parameter data of the sensors or detectors a are also transferred to a recollection unit f which is associated with the "ASSOCIATRON" unit k. The recollection unit f forms recollecting pattern on the basis of the transmission gear shifting control pattern data. Then, the recollection unit f compares the formed recollecting pattern with a respective associative storage pattern stored in an associative storage 1 of "ASSOCIATRON" unit k in order to associatively select one of the associative storage pattern which is the closest to the recollecting pattern. The recollection unit f then transfers recollection data representative of the selected one of the associative storage patterns to a map selection unit g. The map selection unit g is associated with one of the memory address in the associative storage 1 for reading out the transmission gear shifting pattern according to the recollection data.

A decision unit h utilizes the selected transmission gear shifting pattern and determines the automotive power transmission speed ratio according to the instantaneous transmission gear shifting control parameter data from the sensors or detectors. Based on the determined automatic power transmission speed ratio, an operating unit i becomes active for causing actual shifting of the speed ratio in the automatic power transmission j.

FIG. 2 shows the preferred construction of the automatic power transmission gear shift control system which is suitable for practically implementing the automatic power transmission gear selected utilizing the "ASSOCIATRON" k set forth above. In the embodiment shown, a steering angle sensor 2, an engine speed sensor 3, a throttle angle sensor 4, a vehicle speed sensor 5 and a vehicular cabin noise sensor 6 are employed as the sensors or detectors a. The steering angle sensor 2 is associated with a vehicular steering mechanism and designed for monitoring angular position of vehicular steering in relation to a predetermined steering neutral position. The steering angle sensor 2 produces a steering angle signal St. The engine speed sensor 3 monitors a revolution speed of the engine to produce an engine speed indicative signal N. The engine speed sensor 3 may comprise a crank angle sensor which monitors revolution speed of a crankshaft of the engine. The throttle angle sensor 4 is designed for monitoring the throttle valve angular position which varies between a fully closed position and a fully open position. The throttle angle sensor 4 produces a throttle angle indicative signal 0. The vehicle speed sensor 5 monitors the vehicle traveling speed to produce a vehicle speed indicative signal V. The vehicular cabin noise sensor 6 monitors noise level. Here, the word "noise" used to represent acoustic vibration generated in the vehicular cabin and varible in level depending upon the vehicle driving conditions such as road noise, power noise, screaming noise and so forth. The vehicular cabin noise sensor 6 produces a noise level indicative signal Sd.

Reference numeral 7 represents a differentiation/integration circuit array for processing the input signals from the sensors. The differentiation/integration circuit array 7 comprises an integrator circuit and differentiation circuits 8, 9, 10,11 and 12. The integrator circuit 8 and the differentiation circuit 9 are connected to the steering angle sensor 2 to respectively receive the steering angle indicative signal St. The integrator circuit 8 is designed to integrate the steering angle indicative signal St over a predetermined unit time for producing integrated steering angle data St". On the other hand, the differentiation circuit 9 is designed to differentiate the steering angle indicative signal St over the unit time for producing a steering speed data St'. Similarly, the differentiation circuit 10 receives the engine speed indicative signal N and differentiates the engine speed indicative signal over the unit time for producing an engine speed variation data N'. The differentiation circuit 11 receives the throttle angle indicative signal $\theta$ to differentiate the received signal over the unit time for deriving throttle angle variation rate $\theta'$. Also, the differentiation circuit 12 differentiates the vehicle speed indicative signal V over the unit time to derive a vehicle speed variation rate V'.

The steering angle sensor 2, the engine speed sensor 3, the throttle angle sensor 4, the vehicle speed sensor 5 and the vehicular cabin noise sensor 6 are directly connected to a multiplexing unit 15a of a control unit 15. The integrator 8 and the differentiation circuits 9, 10, 11 and 12 are also connected to the multiplexing unit 15a.

The control unit 15 also has an "ASSOCIATRON" unit 15b which may comprise a microprocessor including CPU, RAM, ROM and so forth. The control unit 15 is further connected to a timer 13 which is designed to produce a periodic timing signal at every predetermined interval which corresponds to the unit time. A manually operable input switch array 14 which is adapted to be operated by the driver, is also connected to the the control unit 15 for receiving the manually input command. For example, the input switch array 14 may comprise a two position switch provided in the vicinity of the driver's seat so that the driver may manually select the transmission gear shifting mode. In the embodiment shown, the input switch array 14 is adapted to produce commands CTI and CTII, respectively the commands being mode selector commands for selecting one of preset transmission gear shifting modes for use in heavy traffic and in ordinary traffic. However, the specific type of commands CTI and CTII are exemplary shown as traffic condition dependent mode selector commands variation in the type of command may be applicable depending upon requirement. For example, as in the prior art, the manual mode selection for variation of the transmission speed ratio can be done in terms of road friction, for example, between a normal road and a slippy road such as that on snow.

The control unit 15 is programmed to implement "ASSOCIATRON" logic or neuron logic for writing vehicle driving pattern and associated transmission gear shifting patterns, and for associatively recollecting pre-stored transmission gear shifting patters according to the instantaneous vehicle driving pattern. Also, the control unit 15 stores transmission gear shifting pattern maps. Furthermore, a RAM in the ASSOCIATRON unit 15b has an associative parameter array which comprises a plurality of memory cells, each serving as a neuron. The neurons are arranged in a form of matrix. The parameter array is formed so as to store the driving condition indicative parameters with coupling coefficients $M(I, J)$ for respective neurons $X(I)$. Therefore, the parameters St, St', St'', N, N', $\theta$, $\theta'$, V, V' and Sd are stored in respectively relevant neurons $X(I)$ as inputs via the multiplexing unit 15a. Simultaneously, the coupling coefficients $M(I, J)$ are stored as driving condition pattern data in the parameter array of the associative storage during a pattern writing operation. Each pattern stored in the parameter array is associated with one of a plurality of transmission gear shifting patterns. Namely, if the writing of the pattern is initiated in response to CTI for setting the transmission gear shifting mode adapted to a heavy traffic mode, the written pattern is used for selecting the transmission gear shifting pattern in heavy traffic as that performed upon commanding CTI. Similarly, the write mode operation is triggered in response to the CTII command, the patterns is stored for associatively select the transmission gear shifting pattern in ordinary traffic.

On the other hand, in associative recollection, the "ASSOCIATRON" unit receives the parameter data via the multiplexing unit 15a. The "ASSOCIATRON" unit forms a recollection pattern according to the received parameters and thus associatively recollects the closest stored pattern in the parameter array. Then, transmission gear shifting pattern corresponding to recollected pattern is used for controlling the transmission gear shifting.

The "ASSOCIATRON" unit 15b thus outputs a transmission gear shifting command Ss to a shift control unit 16. The shift control unit 16 is responsive to the shifting commend Ss from the "ASSOCIATRON" unit 15b for outputting a shift control signal Sv to an automatic power transmission 17 for operating shift valves to the relevant valve positions for setting the transmission speed ratio at the commanded gear position.

In practical transmission speed ratio selection, the driver may wish to hold the transmission speed ratio at a second range (2 range) while the vehicle is in heavy traffic. Therefore, in a normal or ordinary automatic power transmission, the driver may shift the selector lever to the 2 range position for manually selecting the second speed ratio. In the prior proposed advanced system, the vehicle in heavy traffic is automatically detected on the basis of a preselected singular vehicle driving parameter, such as the throttle angle variation or variation of the longitudinal acceleration. As set forth, judgement of the vehicle driving condition relying on a singular parameter can lead to an erroneous judgement causing erroneous selection of the transmission gear shift pattern.

The embodiment shown of the transmission shift control system according to the present invention employs a plurality of vehicle driving condition indicative parameters for recollecting a pre-stored vehicle driving pattern utilizing an "ASSOCIATRON". This is intended to match an automatically made judgement of the vehicle driving condition to that manually made by the driver. The embodiment shown of the transmission gear shifting control system further employs a strategy of learning a driving pattern in the parameter array for enhancing accuracy in recollection of the driving pattern.

Figure 3:
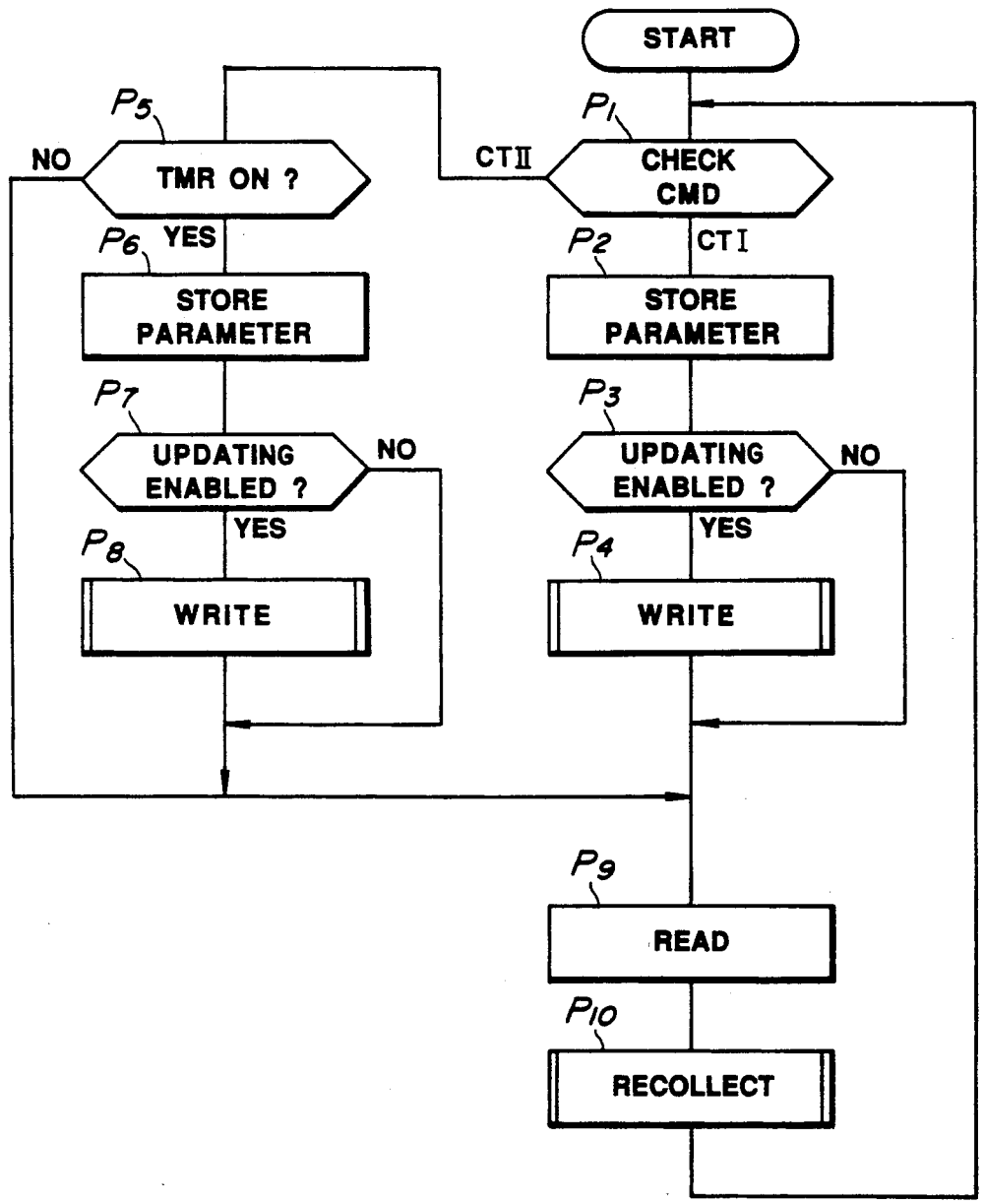
FIG. 3 is a flowchart showing operation of the preferred embodiment of the automatic power transmission gear shifting control system of FIG. 2.

FIG. 3 shows a flowchart showing a routing to be executed by the "ASSOCIATRON" unit 15b. Practical operation for writing a driving pattern and recollecting the pre-stored pattern is performed according to the process illustrated in the flowchart of FIG. 3.

Immediately after starting execution, the input from the input switch array 14 is checked at a step P1. In practice a check at the step P1 is performed whether the command CMD manually input is CTI or CTII in the embodiment shown. When the input command CMD is CTI command, it can be understood that the driver is manually selecting the transmission shifting pattern for heavy traffic. At the same time, the various driving condition indicative parameters should represent the status of a corresponding vehicle driving parameter in heavy traffic. Namely, in heavy traffic, the steering is maintained substantially at a neutral position. Therefore, the steering angle indicative signal St has to be maintained at a value substantially representative of the steering neutral position. Also, since the steering angular displacement is substantially small, the steering speed indicative value St' and the integrated value St'' are held smaller. Furthermore, the engine speed indicative signal value N is maintained smaller to represent low or intermediate vehicle speed range. Also, variation of the throttle angle indicative signal $\theta$ has to be maintained at small value. In addition, because the engine is running at relatively low speed and the vehicle is also running at low speed, the noise level within the vehicular cabin has to be low level.

Since the driver positively and manually enters the CTI command based on judgement that the traffic condition is a heavy traffic condition, respective parameter data St, St', St'', N, N', $\theta$, $\theta'$, V, V' and Sd can be sampled for a pattern data as heavy traffic condition representative pattern for the "ASSOCIATRON" unit 15b, at a step P2. The sampled pattern data are stored in the temporary storage m at the step P2.

Figure 4:
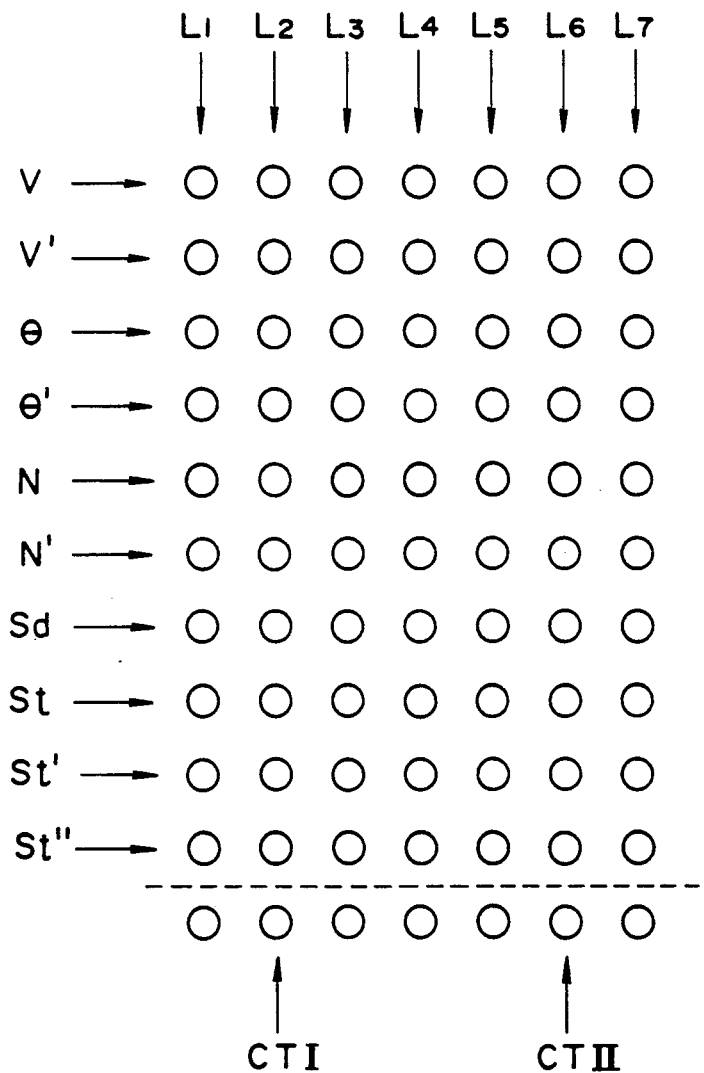
FIG. 4 is a chart showing the matrix of "neurons" in application to the "ASSOCIATRON" for automatic power transmission gear shifting control.
Figure 5:
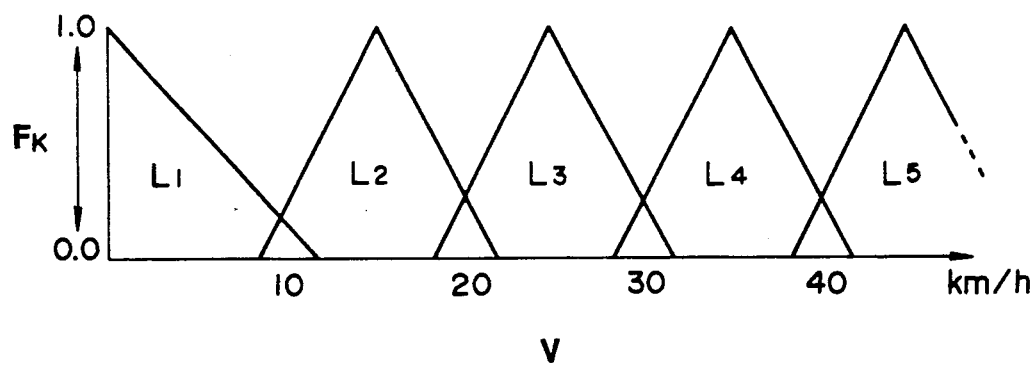
FIG. 5 is an explanatory illustration showing the membership function employed in the "ASSOCIATRON"

As shown in FIG. 4, in the embodiment shown, the "ASSOCIATRON" unit 15b has a matrix of 7×11 neurons. Each row of the neuron matrix is provided for each parameter. Each column of the neuron matrix is provided for representing a range of values of each parameter. The range of each parameter is set as a "membership function". The example of the membership function for the vehicle speed V is shown in FIG. 5. As can be seen from FIG. 5, the membership function is determined as a function of the value of the parameter as indicated in the abcissa utilizing a membership value Fk in the ordinate.

By utilizing a membership function, required storage capacity for each parameter can be significantly reduced. Because of reduction of memory capacity, data processing speed becomes higher. In the example of FIG. 5 shown, the membership functions are set at L1, L2, L3, L4, L5, L6 and L7 as shown according to the vehicle speed V. In general, these membership functions as employed are classified as "very small" "small" "slightly small", "ordinary", "slightly large", "large" and "very large" . . .

The neuron matrix has a row specifically provided for a manually entered command CMD through the input switch array 14. One of the neurons in this specific row is provided for a CTI command. Another neuron in this specific row is provided for a CTII command. In FIG. 4, the specific row is provided in the lowermost row. The neuron for storing the CTI command stores specific transmission gear shifting pattern data. For example, the data stored in the CTI command storing neuron will be data representative of a command for 2 range hold mode (2HLD). The "ASSOCIATRON" unit 15b also has matrix for coupling coefficient M(I, J) representative of the coupling strength of a respective neuron. This coupling coefficient M(I, J) is provided for respective transmission gear shifting modes. Every time the CTI command is input, the corresponding pattern data in the neuron matrix and coupling coefficient M(I, J) for a respective neuron are updated.

After sampling and holding the pattern data in the temporary storage m at the step P2, the vehicular driving condition is checked as to whether the driving condition satisfies a predetermined pattern data updating condition, at a step P3. In the embodiment shown, updating of the pattern data is enable when the vehicle is not running or is substantially stopping. Namely, while the vehicle is substantially stopping, variation of the transmission speed ratio cannot be demanded, therefore, updating of the vehicular driving pattern data with inhibiting recollection of the vehicular driving pattern, may not affect the response characteristics of the transmission shift control operation. Therefore, substantially a stopping state of the vehicle may be represented by removal of an ignition key from a key hole or by application of a parking brake. Also, a vehicular stopping state may also be detected from substantially zero value of the vehicle speed signal provided from the vehicle speed sensor 5. When substantially stopping of the vehicle is detected as checked at the step P3, writing a process is performed at a step P4.

On the other hand, if the entered command is CTII commanding a transmission speed ratio variation mode in normal traffic as checked at the step P1, it implies that the driver does not judge the current traffic to be heavy to require the heavy traffic mode transmission gear pattern.

At the step P5, the periodic clock TMR from the timer 13 is checked. When the level of the periodic clock TMR is LOW, then the process returns to the step P1 to wait for the HIGH level periodic clock TMR. When the HIGH level periodic clock is detected at the step P5, therefore, judgement can be made that the traffic condition is ordinary or normal. At this time, the process goes to step P6 in which respective parameter data St, St', St", N, N', $\theta$, $\theta'$, V, V' and Sd can be sampled as a pattern data as ordinary traffic condition representative pattern for the "ASSOCIATRON" unit 15b. The sampled pattern data are stored in the temporary storage m at the step P6. Updating of the pattern data in ordinary traffic is performed at step P6. After sampling and holding the pattern data in the temporary storage m at the step P6, the vehicular driving condition is checked as to whether the driving condition satisfies the aforementioned predetermined pattern data updating condition, at a step P7. In the embodiment shown, updating of the pattern data is enabled when the vehicle is not running or substantially stopping. When satisfaction of the predetermined updating condition is detected as checked at the step P6, a writing process is performed for updating driving pattern data in the ASSOCIATRON unit, at a step P8.

The practical implementation of writing a driving pattern for "ASSOCIATRON" unit will be discussed hereinbelow. Assuming the number of memory cells which serves as a neuron is n, which are respectively assigned address or neuron numbers such as $C_1$, $C_2$ ... $C_n$, and further assuming that the state of the cell $C_i$ (i=1, 2 ... n) is $X_1$, the coupling coefficient M(i, J) with respect to the cell $C_1$ and cell $C_j$ which is located adjacent the cell $C_i$ can be represented by $M_{ij}$. Here, when the cell $C_i$ has no data, the coupling coefficient $M_{ij}$ becomes zero (0). Here, when a certain driving pattern is input, the status of respective cells becomes $X_1$, $X_2$ . . . $X_n$. Here, the $X_i$ is variable between 1 and $-1$. The coupling coefficient $M_{ij}$ is increased by one (1) when the polarity of the states of the adjacent cells are equal and otherwise reduced by one (1). This can be illustrated by the following formula which is derived by slightly modifying Hepp's synapse strength formula:

$$M_{ij}M_{ij}+X_iX_j$$

The foregoing formula represents that, when the adjacent neurons are both excited simultaneously, the synapse therebetween is strengthened. This theory is well known in the neuron computer field. Therefore, by repeating entry of same or a similar driving pattern, the coupling coefficient is strengthened or becomes of greater value. Therefore, by repeating entry of driving pattern data over a predetermined number of times, the synapse becomes sufficiently strengthened and thus reliable.

After a writing process at the step P4 or P8, then, monitoring of a vehicle driving condition is performed at a step P9. Monitoring of the vehicle driving condition is practically performed by reading out the parameter data input from the sensors or detectors. Thereafter, recollection a process is performed at a step P10.

In the recollection process, the parameter data St, St', St", N, N', $\theta$, $\theta'$, V, V' and Sd are monitored and read out at a step P7. These pattern data are treated as recollection data. Recollection is then performed at a step P8. Assuming the recollection data is X, the recollection output y (=$y_1$, $y_2$ ... $y_n$) can be illustrated by:

$$y_i=\phi(M_{i1}\times X_1+M_{i2}\times X_2 \ldots M_{ij}\times X_j \ldots M_{in}\times X_n)$$

where $\phi(Z)$ is equivalent to SGN coefficient of BASIC language and is variable between 1 (when Z is positive), 0 (when Z is zero) and $-1$ (when Z is negative).

As will be appreciated herefrom, the coupling coefficient represents coupling status of respective cells to other cells. The ASSOCIATRON unit 15b thus associatively recollects the pre-stored pattern in response to the recollection input and the stored coupling coefficients. With this, a driving pattern can be recollected even when a part of recollection data is lacking.

Figure 6:
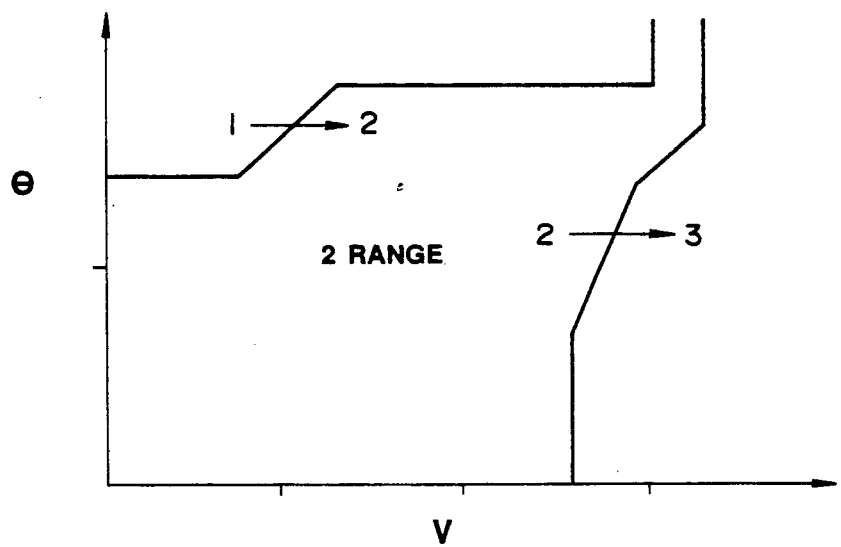
FIG. 6 is a chart showing a gear shifting pattern map to be used in a heavy traffic state.

Namely, when the command data, i.e. CTI or CTII command data is lacking and the recollection data represents a heavy traffic condition, the CTI command data can be associatively recollected and filled by making a judgement that the current traffic condition is heavy as recorded. Then, the 2 range holding command 2HLD can be selected as that when the 2HLD command is set as the CTI command in the lowermost row of the neuron matrix. In response to this, the transmission gear shifting pattern for 2 range holding as illustrated in FIG. 6 is selected.

Figure 7:
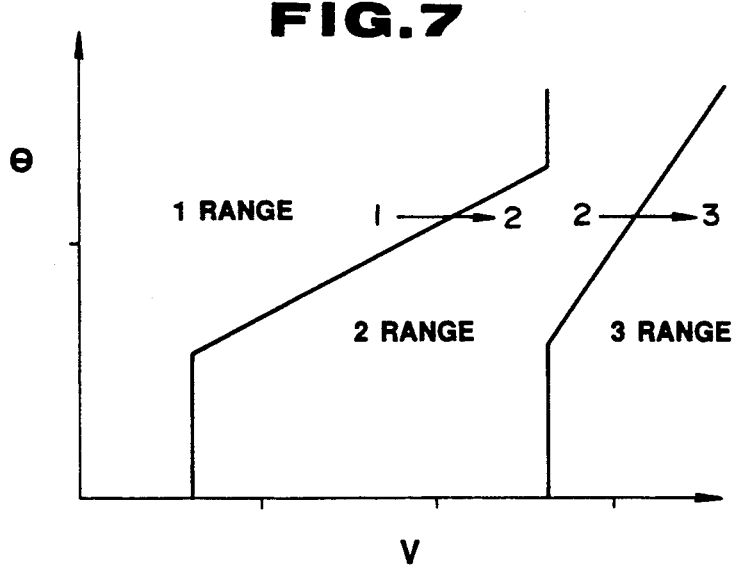
FIG. 7 is a chart showing a gear shifting pattern map to be used in an ordinary traffic state.
Figure 8:
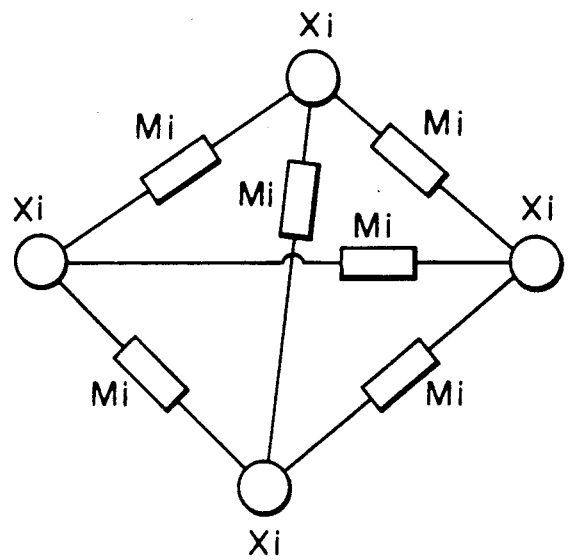
Figure 9:
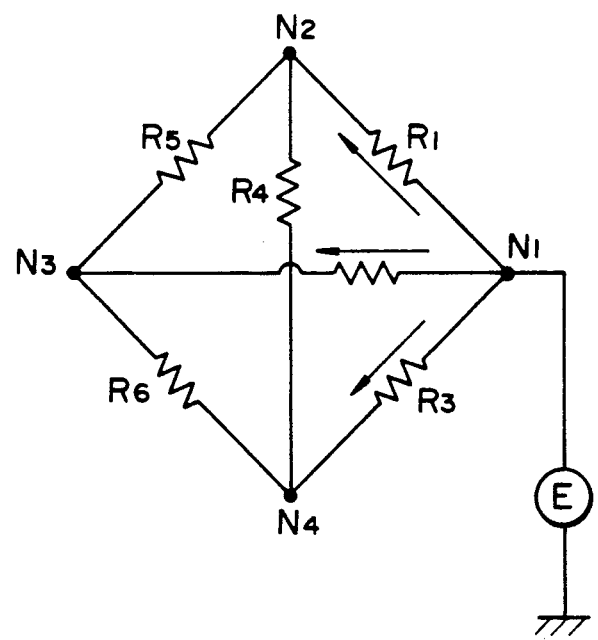
Figure 11A:
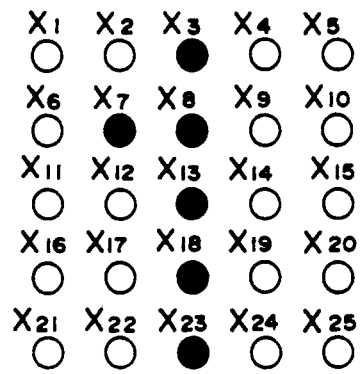
FIGS. 11(a), 11(b) and 11(c) show the matrix of "neurons" in the associative memory storing data.
Figure 11B:
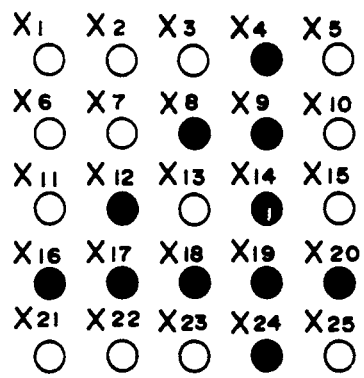
Figure 11C:
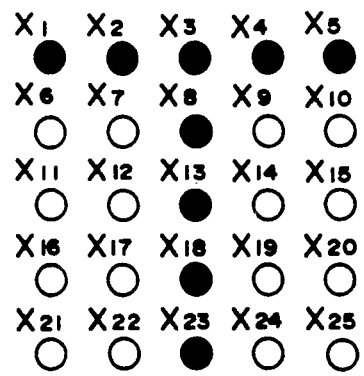

In the embodiment shown, the 2 range is set at wider range in comparison with that in the normal transmission shifting pattern as illustrated in FIG. 7. Therefore, in heavy traffic, it is successfully prevented from shifting the transmission speed ratio to a higher speed ratio, i.e. 3 range or 4 range.

Furthermore, when certain pattern data in the recollection data is lacking in addition to lacking of the transmission gear shifting pattern indicative command, the missing data can be supplemented by the recollected closest driving pattern stored in the neuron matrix. Therefore, even when one or two patterns of data are lacking, it is still possible to associatively recollect the driving pattern which accurately corresponds to the current driving condition.

As will be appreciated herefrom, according to the process shown, since updating of the driving pattern data in the ASSOCIATRON unit is performed only when the vehicle stops in which no demand for variation of transmission speed ratio can be caused, updating of the driving pattern data may not interfere with recollection and a subsequent shifting operation.

It should be appreciated that even though the embodiment shown selects the vehicle stopping state as a driving pattern data updating condition, various vehicle driving states in which transmission speed ratio variation demand cannot occur, can be selected as enabling conditions for updating of the vehicle driving data. Furthermore, if necessary, a there can be process for manually canceling a selected transmission shifting pattern when the selected one does not fit the demand. Furthermore, in order to make recollection based on the stored driving data reliable, it may be possible to introduce counting of sampling of the corresponding driving pattern data. For example, after updating the pattern data a pattern writing counter is counted up by one (1). The pattern writing counter value is compared with a predetermined updating criterion. The updating criterion is set at a value representative of the occurrence updating of the pattern data and the coupling coefficient. The number of updating event for setting the updating criterion may be determined to provide sufficiently high reliability for the pattern data and coupling coefficients for respective neurons to accurately recollect the vehicular driving condition close to the set driving condition. Namely, the updating is repeated until the coupling coefficients are accumulated at a sufficiently large value. Therefore, until the pattern writing counter value reaches the updating criterion, operation for recollection of the vehicle driving pattern is inhibited. Therefore, when the pattern writing counter value is smaller than the updating criterion, then the process of the steps P1 through P8 is repeated until the writing counter value becomes greater than the criterion. Such a process has been disclosed in the co-pending U.S. patent application Ser. No. 375,970 set forth above. The disclosure of the above-identified co-pending U.S. patent application will be herein incorporated by reference for the sake of its disclosure.

As will be appreciated, the present invention can fulfill all of the objects and advantages sought therefor.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the embodiments shown which can be embodied without departing from the principle of the invention set out in the appended claims.

What is claimed is:

1. In an automotive vehicle:
   an automatic transmission shiftable in speed ratios;
   means for detecting a plurality of predetermined parameters related to driving conditions in which said automotive vehicle is involved and generating a plurality of output signals indicative of said plurality of predetermined parameters detected, respectively;
   means for modifying some of said plurality of output signals and generating modified output signals;
   switch means manually operable by a driver of said automotive vehicle;
   a programmable computer based control unit operatively coupled with said detecting means, said modifying means and said switch means, said programmable computer based control unit being operative according to associatron logic or neuron logic and including
   means for forming driving pattern data out of said plurality of output signals and said modified output signals and storing said driving pattern data correlated to an output of said switch means;
   means for updating said driving pattern data under a predetermined condition of said automotive vehicle; and
   means for recollecting said driving pattern data upon receiving said output signals and said modified output signals which generally represent said driving pattern data; and
   means responsive to said driving pattern data recollected for effecting shift control of said automatic transmission.

2. An automotive vehicle as claimed in claim 1, wherein under said predetermined condition of said automotive vehicle, said automotive vehicle is at a standstill.

3. An automotive vehicle as claimed in claim 2, wherein said programmable computer based control unit includes a matrix including a plurality of rows of neurons, said rows corresponding to said output signals and said modified output signals, respectively.

* * * * *